US011469812B2

(12) United States Patent
Zander et al.

(10) Patent No.: US 11,469,812 B2
(45) Date of Patent: Oct. 11, 2022

(54) OPERATING DEVICES IN A WIRELESS COMMUNICATION SYSTEM

(71) Applicant: Sony Corporation, Tokyo (JP)

(72) Inventors: Olof Zander, Södra Sandby (SE); Erik Bengtsson, Eslöv (SE)

(73) Assignee: Sony Group Corporation, Tokyo (JP)

( * ) Notice: Subject to any disclaimer, the term of this patent is extended or adjusted under 35 U.S.C. 154(b) by 98 days.

(21) Appl. No.: 16/962,206

(22) PCT Filed: Dec. 21, 2018

(86) PCT No.: PCT/EP2018/086670
§ 371 (c)(1),
(2) Date: Jul. 14, 2020

(87) PCT Pub. No.: WO2019/141499
PCT Pub. Date: Jul. 25, 2019

(65) Prior Publication Data
US 2020/0366361 A1  Nov. 19, 2020

(30) Foreign Application Priority Data
Jan. 16, 2018 (SE) .................................. 1830015-2

(51) Int. Cl.
*H04L 5/00* (2006.01)
*H04B 7/10* (2017.01)
*H04B 7/0413* (2017.01)
*H04W 56/00* (2009.01)

(52) U.S. Cl.
CPC ............. *H04B 7/10* (2013.01); *H04B 7/0413* (2013.01); *H04L 5/0048* (2013.01); *H04W 56/001* (2013.01)

(58) Field of Classification Search
CPC .... G01S 13/726; G01S 7/025; H04W 72/046; H04W 56/001; H04B 7/0408; H04B 7/063; H04B 7/10; H04B 7/0413; H04B 7/0452; H04B 7/0404; H04B 7/0684; H04L 5/0048
USPC .......................................... 370/329; 375/343
See application file for complete search history.

(56) References Cited

U.S. PATENT DOCUMENTS

2003/0092379 A1  5/2003  Brothers et al.
2017/0033848 A1* 2/2017  Cordeiro .............. H04B 7/0452
2018/0212662 A1  7/2018  Ren et al.

OTHER PUBLICATIONS

International Search Report and Written Opinion from corresponding International Application No. PCT/EP2018/086670, dated Feb. 26, 2019, 17 pages.

* cited by examiner

Primary Examiner — Phuoc H Doan
(74) Attorney, Agent, or Firm — Tucker Ellis LLP

(57) ABSTRACT

The present application relates to methods for operating a communication de-vice. According to an embodiment, the method comprises transmitting (201) configuration data (300) indicating a first polarization of a first radio frequency signal (301) and a second polarization of a second radio frequency signal (302), transmitting (202) the first radio frequency signal (301) using the first polarization, and transmitting (203) the second radio frequency signal (302) using the second polarization.

16 Claims, 3 Drawing Sheets

OPERATING DEVICES IN A WIRELESS COMMUNICATION SYSTEM

FIELD OF THE INVENTION

The present invention relates to methods for operating communication devices in a wireless communication system, in particular to methods for operating communication devices according to multiple input and multiple output (MIMO) technologies. The present invention relates furthermore to communication devices and a communication system supporting the methods.

BACKGROUND OF THE INVENTION

Increasing use of mobile voice and data communications may require a more efficient utilisation of the available radio frequency resources. For increasing data transmission performance and reliability, the so-called multiple input and multiple output (MIMO) technology may be used in wireless radio telecommunication systems for transmitting information between the devices, for example between a base station and a user equipment. The user equipment may comprise mobile devices like mobile phones, mobile computers, tablet computers or wearable devices, and stationary devices like personal computers or cash registers. In systems using MIMO technologies the devices may use multiple send and receive antennas. For example, the base station as well as the user equipment may each comprise multiple send and receive antennas. The MIMO technology forms the basis for coding techniques which use the temporal as well as the spatial dimension for transmitting information. The enhanced coding provided in MIMO systems may increase the spectral and energy efficiency of the wireless communication.

The spatial dimension may be used by spatial multiplexing. The spatial multiplexing is a transmission technique in MIMO communications to transmit independent and separately encoded data signals, so-called streams, from each of the multiple transmit antennas or a combination thereof. Therefore, the spatial dimension is reused or multiplexed more than one time.

The so-called full dimensional MIMO (FDMIMO) refers to a technology that arranges the signals transmitted to antennas in the form of beams that are able to power multiple receivers in three dimensions. For example, a base station may comprise a large number of active antenna elements in a two-dimensional grid and the use of the FDMIMO technology enables a support of many spatially separated users on the same time/frequency resource blocks simultaneously. This may reduce interference from overlapping transmissions to other receivers and increases the power of the signal. The beams may form virtual sectors which may be static or dynamic in view of the base station. The large number of antennas of the base station allows radio energy to be spatially focused in transmissions as well as a directional sensitive reception which improves spectral efficiency and radiated energy efficiency. In order to adapt the transmit signal at each individual antenna of the base station in accordance with the currently active receiving user equipment, a base station logic may need information about radio channel properties between the user equipment and the antennas of the base station. Vice versa, in order to adapt the transmit signal at each individual antenna of the user equipment, a user equipment logic may need information about the radio channel properties between the base station and the antennas of the user equipment. For this purpose, a so-called channel sounding may be performed to determine the radio channel properties between the user equipment and the base station. The channel sounding may comprise transmitting predefined pilot signals which may allow the base station and the user equipment to set their configuration antenna parameters for transmitting signals so as to focus radio energy or for receiving radio signals from a certain direction.

When the operational frequency increases and consequently the wavelength decreases, the antenna aperture becomes small and therefore multiple antennas may be utilised to increase the received power. In particular in case of high transmission frequencies of for example 30 GHz or more and multiple antennas having small apertures, the reception sensitivity may significantly depend on polarization of the transmitted radio-frequency signals. However, in particular when the user equipment is a movable device, the polarization of the antennas of the user equipment may vary with respect to the antenna arrangement of the base station.

In evolving standards, for example in 3GPP RAN1 Release 15, is defined that the base station broadcasts beam shaped synchronisation signals (so-called SS-bursts). Different SS-bursts targeting different directions or polarizations are distributed both in time and frequency domain such that each beam is occurring at each sub-band over time. The user equipment may listen for the SS-bursts and may use the received signal to calibrate frequency and timing. The user equipment may scan or adjust its receive beam in order to find the direction that is associated with the strongest SS-burst. However, the polarization of the SS-burst signal may not be optimal for the user equipment depending on the current arrangement of the antennas of the user equipment. For improving the receive beam adjustment of the user equipment, the base station may repeat each SS-burst signal with an orthogonal polarization. However, as the user equipment may receive also SS-burst signals transmitted in other sectors, for example neighbouring sectors or due to reflections, it may be difficult for the user equipment to find the strongest beam and optimize the receive beam polarization.

In view of the above, there is a need in the art for methods and devices which address at least some of the above shortcomings of conventional MIMO systems. In particular, there is a need in the art for improving operation of devices in a wireless communication system to reduce the power losses of wireless communications due to polarization misalignments.

SUMMARY OF THE INVENTION

According to the present invention, this object is achieved by the features of the independent claims. The dependent claims define embodiments of the invention.

According to the present invention, a method for operating a communication device is provided. The communication device may be operated in a wireless communication system and may have an antenna arrangement configured to adjust the polarization of radio frequency signals to be transmitted via the antenna arrangement. For example, the communication device may comprise a base station or an access point of the wireless communication system. According to the method, configuration data indicating a first polarization of a first radio frequency signal and a second polarization of a second radio frequency signal are transmitted. Furthermore, the first radio frequency signal is transmitted using the first polarization, and the second radio frequency signal is transmitted using the second polarization.

The first radio frequency signal may comprise a first synchronisation signal, and the second radio frequency signal may comprise a second synchronisation signal. In particular, the first and second radio-frequency signals may comprise shaped synchronisation signals, so-called SS-bursts, or pilot signals for synchronising devices operated in the communication system and for analysing a communication channel between devices operated in the communication system, for example by channel sounding. The configuration data may be transmitted using a broadcast channel. Likewise, the first radio frequency signal and the second radio frequency signal may be transmitted using a broadcast channel. The first polarization and the second polarization may be different. In particular, the first polarization and the second polarization may be orthogonal to each other.

Based on the configuration data indicating the first polarization and the second polarization, a receiving communication device (for example a user equipment) which receives the first and second radio-frequency signals may adjust its receiver configurations to optimize the received power and antenna gain, and may additionally request from the transmitting communication device (for example a base station) to use a certain polarization for future transmissions, in particular transmissions of payload data. By transmitting the configuration data indicating the first polarization of the first radio frequency signal and the second polarization of the second radio frequency signal, the information that polarized radio-frequency signals will be transmitted is shared between the transmitting communication device and the receiving communication device such that the receiving communication device may initiate optimization of its receiver configurations based on the subsequently received first and second radio frequency signals.

According to an embodiment, the configuration data includes a first identifier uniquely identifying the first radio frequency signal and a second identifier uniquely identifying the second radio frequency signal. The first and second identifiers may enable the receiving communication device to reliably identify the first and second radio frequency signals. In particular in sectorized transmissions, the receiving communication device may receive radio frequency signals which are not intended for the receiving communication device, for example due to reflections. Based on the first and second identifiers consideration of such radio-frequency signals, which are not intended for the receiving communication device, may be avoided.

For example, the configuration data may comprise an association definition identifying the first and second radio frequency signals and/or that the first and second radio frequency signals are associated to each other. Further the configuration data may indicate that the first radio frequency signal and the second radio frequency signal differ in their corresponding first and second polarization only.

According to another exemplary embodiment, the configuration data indicates a first directionality of the first radio frequency signal and a second directionality of the second radio frequency signal. The first radio frequency signal is transmitted using the first polarization and the first directionality, and the second radio frequency signal is transmitted using the second polarization and the second directionality. The first and second directionality may be the same directionality. In other words, the first and second radio frequency signal may have the same angular properties. The configuration data may indicate the first directionality and the second directionality with respect to a beam sweep including multiple beams of multiple directionalities, for example in a sectorized full dimension MIMO system. Based on the directionality information, a receiving communication device may reliably identify the first and second radio frequency signals and radio frequency signals, which are identified based on the directionality to be not intended for the receiving communication device, may be ignored by the receiving communication device.

According to another embodiment, a request for the configuration data is received and the configuration data is transmitted upon receiving the request. The request for the configuration data may be received at the transmitting communication device, for example at a base station, from a receiving communication device, for example a user equipment. The user equipment may transmit the request for example upon detecting a movement of the user equipment which may influence the receive characteristics of the user equipment, or upon a deterioration of the communication between the user equipment and the base station.

According to a further embodiment, the configuration data comprises selector information indicating the first polarization and the second polarization based on a predefined mapping between a plurality of radio frequency signals and a plurality of polarizations. The predefined mapping, for example in the form of a table or software, may be provided in the transmitting communication device, for example a base station, as well as in the receiving communication device, for example a user equipment. By realising the configuration data as selector information, the configuration data may be more compact compared to detailed information concerning the first and second polarizations of the first and second radio-frequency signals. Therefore, the amount of data to be transmitted for transmitting the configuration data may be reduced.

According to the present invention, a further method for operating a communication device is provided. The communication device may be operated in a wireless communication system and may comprise for example a user equipment, in particular a mobile user equipment, like a mobile telephone, a mobile computer, a tablet computer, a wearable device or a mobile accessory. A wearable device or a mobile accessory may comprise a wearable computer, also known as body born computer or simply wearable, which is a miniature electronic device that may be worn by a user under, with or on top of clothing. According to the method, configuration data indicating a first polarization of a first radio frequency signal and a second polarization of a second radio frequency signal is received. Furthermore, at least one of the first radio frequency signal and the second radio frequency signal is received, and a combined power of the at least one of the first radio frequency signal and the second radio frequency signal is determined based on the configuration data.

For example, the first radio frequency signal may comprise a first synchronisation signal, and the second radio frequency signal may comprise a second synchronisation signal. In another example, the first radio frequency signal and the second radio frequency signal may each comprise a pilot signal for channel sounding a communication channel between a further communication device, for example a base station or an access point of the wireless communication system, and the receiving communication device, for example a user equipment. The configuration data may indicate that the first polarization is orthogonal with respect to the second polarization. The communication device may comprise an antenna arrangement for receiving the configuration data, the first radio frequency signal and the second radio frequency signal. The antenna arrangement may comprise a plurality of antennas. The combined power of the first and second received radio frequency signals may be optimized for example by configuring received parameters of the antenna arrangement of the communication device. For example, the combined power may comprise a function of the first radio frequency signal, the second radio frequency signal and combining information, which may comprise for example phase information and weighing information used when combining the first and second radio frequency signals. For optimizing the combined power, the combining information may be varied. In other words, the radio frequency signals having different polarizations are received at the communication device and then a preferred polarization for the current receiving situation of the communication device is determined. Receive parameters of the communication device may be adapted accordingly. The preferred polarization may be communicated to a sending communication device, for example a base station or an access point of the wireless communication system, and the sending communication device may adapt its polarization settings when transmitting subsequent payload data. Thus, transmission power may be efficiently used.

According to an embodiment, the configuration data includes a first identifier uniquely identifying the first radio frequency signal, and a second identifier uniquely identifying the second radio frequency signal. The first and second identifiers may enable the communication device to reliably identify the first and second radio frequency signals. For example, in sectorized transmissions, the communication device may receive radio frequency signals which are not intended for the communication device, for example due to reflections in street canyons. Based on the first and second identifiers the communication device may ignore such radio-frequency signals, which are not intended for the communication device, from consideration based on the first and second identifiers.

According to an embodiment, a request for configuration data is transmitted. The request for configuration data may be transmitted from the communication device to another communication device, for example a base station, of the wireless communication system. The communication device may transmit the request for example upon detecting a movement of the communication device which may influence the receive characteristics of the communication device with respect to the polarization of the received radio frequency signals. Thus, readjustment of the receive configuration at the communication device and possibly readjustment of the transmit configuration at the other communication device may be initiated by transmitting the request.

According to another embodiment, the configuration data comprises selector information indicating the first polarization and the second polarization based on a predefined mapping between a plurality of radio frequency signals and a plurality of polarizations. The predefined mapping, for example a table indicating associations between radio frequency signals and assigned polarizations, may be provided in the communication device, for example a user equipment, as well as in another communication device, for example a base station of the wireless communication system. The selector information may be more compact compared to detailed information explicitly indicating the first and second polarizations of the first and second radio frequency signals. Thus, the amount of data to be transmitted as the configuration data may be reduced.

According to a further aspect of the present invention, a communication device is provided. The communication device may be operated in a wireless communication system, for example as a base station or an access point. The communication device comprises an antenna arrangement and a logic coupled to the antenna arrangement. The antenna arrangement may be configured to adjust the polarization of a radio frequency signal to be transmitted via the antenna arrangement. The logic is configured to transmit, via the antenna arrangement, configuration data indicating a first polarization of a first radio frequency signal and a second polarization of a second radio frequency signal. The logic is furthermore configured to transmit, via the antenna arrangement, the first radio frequency signal using the first polarization and the second radio frequency signal using the second polarization. The first polarization and the second polarization may be different, for example the first polarization may be orthogonal to the second polarization. The communication device may be configured to perform the above-described method and the embodiments thereof as the transmitting communication device, for example as a base station.

According to another aspect of the present invention, a communication device is provided. The communication device may be operated in a wireless communication system, for example as a user equipment. The communication device comprises an antenna arrangement and a logic coupled to the antenna arrangement. The logic is configured to receive, via the antenna arrangement, configuration data indicating a first polarization of the first radio frequency signal and a second polarization of a second radio frequency signal. The logic is furthermore configured to receive, via the antenna arrangement, at least one of the first radio frequency signal and the second radio frequency signal. Based on the configuration data, the logic is configured to determine a combined power of the at least one of the first radio frequency signal and the second radio frequency signal. The first polarization and the second polarization may be different, for example the first polarization may be orthogonal to the second polarization. Furthermore, the logic may be configured to optimize the combined power by varying combining information relating to the first and second radio frequency signals. In particular, the combined power may be a function of the first and second radio frequency signals and the combining information. The power of each of the first and second radio frequency signals may be represented by complex values. By varying the combining information, the combined power may be optimized, for example such that the combined power becomes maximal by weighing and phase shifting the magnitudes (absolute values) of the powers of the first and second radio frequency signals. The communication device may be configured to perform the above-described method, for example as a user equipment.

Finally, according to the present invention, a wireless communication system is provided comprising the above-described communication devices, for example at least one acting as the transmitting communication device, for example a base station or an access point of the wireless communication system, and at least one acting as the receiving communication device, for example a user equipment.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

The present invention will now be described in more detail with reference to the accompanying drawings.

DETAILED DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Same reference signs in the various drawings refer to similar or identical components. Any coupling between components or devices shown in the figures may be a direct or indirect coupling unless specifically noted otherwise.

Figure 1:
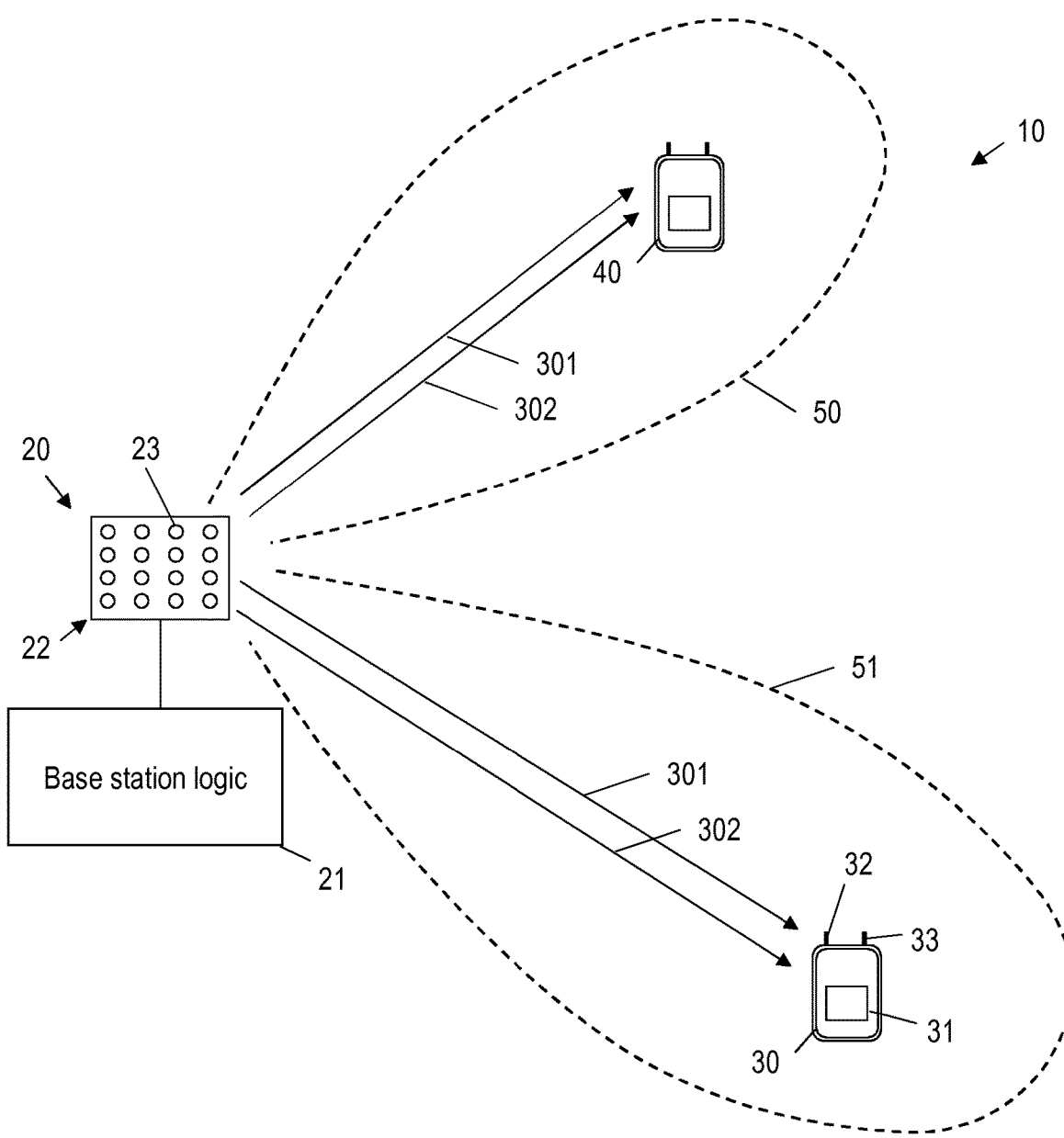
FIG. 1 shows schematically a wireless communication system according to an embodiment of the present invention.

FIG. 1 shows a wireless communication system 10 according to an embodiment. The wireless communication system 10 includes a base station 20 and a plurality of user equipment devices. In FIG. 1, two user equipment devices 30 and 40 are shown. The base station 20 may support a so called multiple input and multiple output (MIMO) technology and therefore the base station 20 may have a large number of antennas, for example several tens or in excess of one hundred antennas.

The base station 20 comprises an antenna arrangement 22 comprising a plurality of antennas which are indicated by circles in FIG. 1. One exemplary antenna of the plurality of antennas is referenced by reference sign 23. The antennas 23 may be arranged in a two-dimensional or three-dimensional antenna array on a carrier. The base station 20 may comprise furthermore associated (not shown) transceivers for the antennas 23. The base station 20 comprises furthermore a base station logic 21. The base station logic 21 is coupled to the antenna arrangement 22 and comprises for example a controller, a computer or a microprocessor. Although in FIG. 1 only one antenna arrangement 22 is shown, the base station 20 may comprise more than one antenna arrangement, for example two, three, four or even more, for example several tens of antenna arrangements, which may cooperate with each other and which may be arranged near to each other or spaced apart.

The antenna arrangement 22 may be configured to transmit radio-frequency signals into specific directions, so-called sectors. Two of these sectors are shown in FIG. 1 and indicated by reference signs 50 and 51. The configuration of the sectors 50, 51 may be static or dynamic. The transmission of radio-frequency signals into a specific direction may be achieved by beamforming technologies as it is known in MIMO technologies.

The antenna arrangement 22 may be equipped with dual polarized antennas and may therefore have the capability to transmit and/or receive signals with any polarization, for example a first polarization and second polarization, wherein the first and second polarizations are orthogonal to each other. Furthermore, in particular spatially distributed antenna arrangements may be capable of transmitting radio-frequency signals having also a third polarization which is orthogonal to the first polarization and orthogonal to the second polarization.

In the communication system 10, as shown in FIG. 1, a plurality of user equipment devices like mobile phones, mobile and stationary computers, tablet computers, smart wearable devices or smart mobile devices may be arranged. Two exemplary user equipment devices 30 and 40 are shown in FIG. 1. Each of the user equipment devices 30 and 40 may be configured to communicate with the base station 20.

In the following, the user equipment 30 will be described in more detail. However, the user equipment 40 may comprise similar features as the user equipment 30 and may therefore act similarly. The user equipment 30 comprises one or more antennas. In the exemplary embodiment shown in FIG. 1, the user equipment 30 comprises two antennas 32 and 33. For example, the antennas 32, 33 may each comprise an antenna panel or an antenna array, or the antennas 32, 33 may be formed by an antenna array comprising a plurality of antennas. Furthermore, the user equipment 30 comprises a logic 31. The logic 31 may comprise for example a controller or microprocessor. The user equipment 30 may comprise more components, for example a graphical user interphase and a battery, but these components are not shown in FIG. 1 for clarity reasons. The antennas 32, 33 of the user equipment 30 may be arranged spaced apart from each other, for example, the two antennas 32 and 33 may be arranged at a top side of the user equipment near the edges. As an alternative, one or more antennas may be arranged at the top side and some other antennas may be arranged at a bottom side of the user equipment 30.

The above described setup may, for example, be used advantageously in the following scenarios. For example, one communication device, e.g. the base station 20 or an access point, may be capable of communicating on arbitrary polarization. The other communication device, e.g. the user equipment 30, may be limited to a single polarization. Furthermore, at least one of the devices may be mobile. Further, uplink and downlink antennas/antenna panels may not be the same, such that reciprocity may not apply, or the number of uplink vs. downlink links is different.

Operation of the base station 20 in connection with the user equipment devices 30 and 40 will be described in more detail in connection with FIG. 2. Although in FIG. 2, reference will mainly be made to user equipment 30, the same operational steps may be performed when operating the base station 20 in connection with the user equipment 40.

Figure 2:
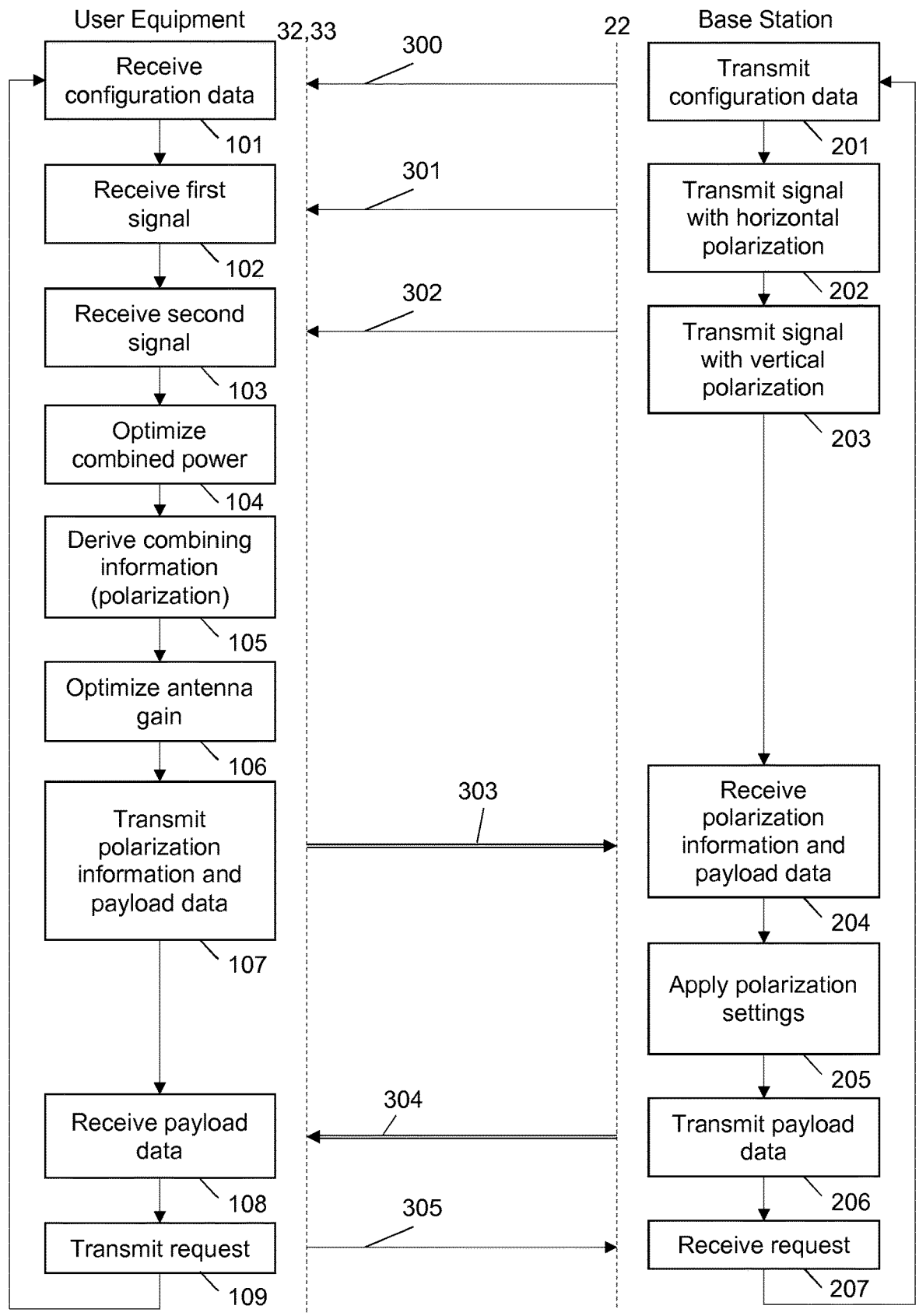
FIG. 2 shows a flowchart comprising method steps according to an embodiment of the present invention.

FIG. 2 shows a flowchart with method steps 101 to 109 performed by the user equipment 30 and method steps 201 to 207 performed by the base station 20. Furthermore, the transmission of radio signals between the antennas 32, 33 of the user equipment 30 and the antenna arrangement 22 of the base station 20 is indicated in FIG. 2 by arrows 300 to 305. In particular, the dashed line 32, 33 represents the antennas 32, 33 of the user equipment 30 and dashed line 22 represents the antenna arrangement 22 of the base station 20. It should be noticed that in FIG. 2 an arrow formed of a single line represents a radio signal transmission of a control signal, and an arrow formed of a double line represents one or multiple radio signal transmissions of payload data.

In step 201 the base station 20 transmits configuration data 300 indicating a first polarization of a first radio frequency signal and a second polarization of a second radio frequency signal. In particular, the configuration data 300 may indicate that the first and second polarizations are orthogonal to each other. The configuration data 300 may include further information, for example a first identifier uniquely identifying the first radio frequency signal, and the second identifier uniquely identifying the second radio frequency signal. The configuration data 300 may be transmitted in step 201 using a broadcast channel defined in the wireless communication system 10. The configuration data 300 may furthermore indicate a first directionality of the first radio frequency signal and a second directionality of the second radio frequency signal. In particular, the configuration data 300 may indicate that the first directionality of the first radio frequency signal is the same as the second directionality of the second radio frequency signal. The directionality of the first radio frequency signal and the second radio frequency signal may be defined by sectors with respect to a beam sweep including multiple teams of multiple directions. For example, the configuration data 300 may indicate that the first radio frequency signal and the second radio frequency signal may have the same directionality of sector 51 as shown in FIG. 1. Thus, the directionality indicates that the first and second radio-frequency signals are intended for devices which are located within the sector 51, for example that the first and second radio frequency signals are intended for user equipment device 30.

Furthermore, the configuration data 300 transmitted in step 201 may indicate a third polarization of a third radio frequency signal. In particular, the configuration data 300 may indicate that the third polarization is orthogonal with respect to the first and second polarizations. The configuration data may indicate that the first radio frequency signal, the second radio frequency signal and the third radio frequency signal differ in their corresponding first, second and third polarization only.

The configuration data 300 may comprise selector information indicating the first polarization and the second polarization based on a predefined mapping between a plurality of radio frequency signals and a plurality of polarizations.

For example, a table may be provided in the base station 20 and the user equipment devices 30, 40 in which associations between radio frequency signals and polarizations are defined. The selector information comprised in the configuration data 300 may include an index to an association defined in the table. Thus, the indication of the polarizations assigned to the radio-frequency signals may be communicated in a compact way from the base station 22 to the user equipment devices 30, 40. In step 101 the user equipment 30 receives the configuration data 300.

In step 202 the base station 20 transmits the first radio frequency signal 301 with the first polarization to the user equipment 30. For example, the first radio frequency signal 301 may comprise a synchronization signal or a pilot signal defined in the wireless communication system. For example, the first radio frequency signal 301 may be transmitted directed or shaped by beamforming to the user equipment 30. Thus, another communication between the base station 20 and the user equipment 40 may not be disturbed by the transmission of the first radio frequency signal 301. Due to the directional transmission, another or the same radio frequency signal may be transmitted to the user equipment 40 at the same time using the same radio frequency resources as indicated by the second arrow 301 in FIG. 1. In step 102 the user equipment 30 receives the first radio frequency signal 301. The first polarization of the first radio frequency signal 301 may be for example a horizontal polarization. In step 203, the base station 20 transmits a second radio frequency signal 302 to the user equipment 30. The second radio frequency signal 302 has a second polarization which is different from the first polarization, for example the second polarization is a vertical polarization. As shown in FIG. 1, the second radio frequency signal having the second polarization may also be transmitted at the same time using the same radio-frequency resources to the user equipment 40 as indicated by the second arrow 302 in FIG. 1. In step 103 the second radio frequency signal 302 is received at the user equipment 30. The first and second radio frequency signals 301, 302 may be separated from each other by using a time division multiple access technology (TDMA) and may therefore be transmitted one after the other. As an alternative, the first and second radio-frequency signals 301, 302 may be separated from each other by using a frequency division multiple access technology (FDMA) or a code division multiple access technology (CDMA). When using FDMA or CDMA, the first and second radio frequency signals 301, 302 may be transmitted at the same time.

The first and second radio frequency signals may be identical signals apart from the polarization. As an alternative, the first and second radio frequency signals may comprise at least partially identical information, for example synchronization information or channel sounding (pilot) information.

Based on the shared configuration data, the user equipment 30 may reliably receive and identify the first and second radio frequency signals 301, 302 directed in the sector 51 and intended for the user equipment 30. In particular, radio frequency signals in other sectors, for example the radio frequency signals 301, 302 directed in sector 50 intended for user equipment device 40, are allocated in different time-frequency resources, which may (unintentionally) reach user equipment device 30 due to reflections, may be reliably distinguished from the radio-frequency signals 301, 302 in sector 51 intended for user equipment device 30. Therefore, only the latter radio frequency signals 301, 302 in sector 51 may be considered by user equipment device 30. This enables the user equipment 30 to determine which of the signals from sector 51 or 50 becomes the strongest with polarization aligned to that of the user equipment receive antenna.

After the user equipment 30 has received the first and second radio frequency signals 301, 302, the logic 31 optimizes in step 104 a combined power which is related to the first and second received radio frequency signals such that the combined power of the first and second received radio frequency signals 301, 302 may be maximized. The combined power may be a function of the first radio frequency signal 301 as it is received at the antennas 32, 33 of the user equipment 30, the second radio frequency signal 302 as it is received at the antennas 31, 32 of the user equipment 30, and a combining information. As a result of the optimization the combining information is derived in step 105. Details on this optimization of the combined power will be described in more detail below in connection with FIG. 3. The combining information comprises for example details on a required polarization of signals from the base station 20 to achieve the optimized combined power.

In step 106, the user equipment 30 optimizes its antenna gain based on the combining information determined in step 105. Details for optimizing the antenna gain in step 106 will also be described in more detail below in connection with FIG. 3.

In step 107 the user equipment 30 transmits the determined combining information along with payload data 303. The combining information along with the payload data 303 is received in step 204 at the base station 20. The combining information may comprise a phase information and a weighting information. During optimization in step 104, the phase information and weighting information is varied such that, when combining the first and second radio frequency signals by using the phase information and the weighting information, the resulting combined power of the first and second received radio frequency signals becomes a maximum. The maximum may be an absolute maximum or at least a relative maximum. Based on the combining information received from the user equipment 30, the base station 20 may determine in step 205 a polarization which may be used for sending subsequent payload data 304 in step 206 to the user equipment 30 resulting in an optimized communication with high power efficiency and high signal-to-noise ratio. The polarization for transmitting downlink payload data from the base station 20 to the user equipment 30 may be determined based on the combining information.

To sum up, in step 204 the base station 20 receives the combining information, and determines in step 205 a corresponding transmit polarization for a transmission of payload data 304 in step 206. Based on the determined transmit polarization the base station 20 may configure its transmission parameters of the antenna arrangement 22 to achieve the determined transmit polarization.

In step 108 the user equipment 30 receives the payload data 304 from the base station 20. Thus, a payload data transmission from the base station 20 to the user equipment 30 may be accomplished which uses an optimized polarization for the communication between the base station 20 and the user equipment 30. The optimal polarization may vary when the user equipment 20 changes its orientation or the properties of the radio channel between the base station 20 and the user equipment 30 varies. Therefore, the user equipment 30 may transmit in step 109 a request 305 for the configuration data. In step 207 the base station 20 receives the request 305 for the configuration data and the whole process may be repeated starting at step 201 in the base station 20 and step 101 in the user equipment 30. Transmitting the request 305 in step 109 may be triggered for example in predetermined time intervals, or whenever the user equipment device 30 determines a significant movement of the user equipment device 30, or whenever the transmission quality or signal power level degrades. Thus, the transmit polarization used by the base station 20 may be kept up-to-date with respect to the current orientation of the user equipment 30 and the properties of the radio channel.

Figure 3:
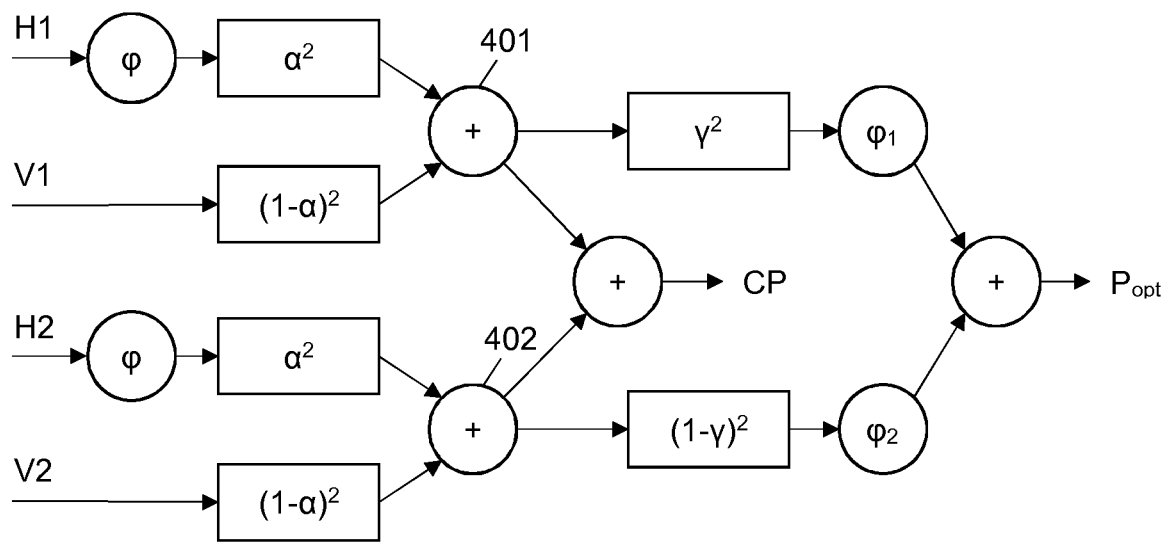
FIG. 3 shows schematically an algorithm for optimizing a combined power of received radio frequency signals and an antenna gain according to an embodiment of the present invention.

FIG. 3 shows details concerning the optimization of the combined power and the antenna gain of steps 104 and 106 of FIG. 2 mentioned above. In the following description, it is assumed that the first radio frequency signal 301 has a horizontal polarization and the second radio frequency signal 302 has a vertical polarization. However, other polarizations may be used as long as the polarization of the first radio frequency signal 301 is different, in particular orthogonal, from the polarization of the second radio frequency signal 302. Furthermore, in the following exemplary explanation, the user equipment 30 is assumed to have two antennas. Nevertheless, the method described in the following may support any number of antennas at the user equipment.

First, the optimization of the combined power will be described (step 104 of FIG. 2). The combined power is abbreviated in FIG. 3 by CP. As an input, the received radio frequency signals 301, 302 with the horizontal and vertical polarization are used. The first radio frequency signal 301 with the horizontal polarization received at the first antenna 32 of the user equipment 30 is indicated by H1. The second radio frequency signal 302 having the vertical polarization and which is received at the first antenna 32 is indicated by V1. The first radio frequency signal 301 with the horizontal polarization which is received at the second antenna 33 of the user equipment 30 is indicated by H2, and the second radio frequency signal 302 with the vertical polarization received at the second antenna 33 is indicated by V2. The following processing of the received signals H1, V1, H2 and V2 may be performed in the logic 31. Absolute values of the received signals H1 and H2 are phase shifted by a phase information $\varphi$. It is to be noticed that the same phase information 9 is used for phase shifting the signals H1 and H2. In case more than two antennas are used for receiving the horizontally polarized radio frequency signal, the same phase information 9 is used for all these signals. Next, the phase shifted signal H1 is weighted by a weighting information $\alpha^2$, and the signal V1 is weighted by a complementary weighting information $(1-\alpha^2)$. The same weighting is performed for absolute values of the signals H2, V2 received at the second antenna, that means that the phase shifted signal H2 is weighted with weighting information $\alpha$, and the signal V2 is weighted with the weighting information $(1-\alpha)^2$. In case of more than two antennas each pair of vertical and horizontal signals is weighted as described above with the same weighting information. Then, for each antenna the resulting horizontal and vertical powers are added (see reference signs 401 and 402). Finally, the combined power CP is the sum of the powers determined for each antenna. Thus, the combined power CP is a function of the radio frequency signals received at the antennas 32, 33 of the user equipment 30 and the phase information $\varphi$ and the weighting information $\alpha$. The following formula shows this in detail:

$$CP = f(|H1|+|H2|)e^{j\varphi}\alpha^2 + (|V1|+|V2|)(1-\alpha)^2)$$

For optimizing the combined power CP, the phase information $\varphi$ and the weighting information $\alpha$ may be varied. In particular, a so-called maximum ratio combining technique may be applied to vary these parameters $\varphi$ and $\alpha$ for obtaining an optimized combined power CP. The above-mentioned combining information comprises the phase information $\varphi$ and the weighting information $\alpha$, which may be used by the base station logic 21 to configure its transmission parameters of the antenna arrangement 22 such that payload data signals 304 may be transmitted having a polarization which leads to an optimized communication at low power with high signal-to-noise ratio.

For optimizing the antenna gain Popt (step 106 of FIG. 2), a further maximum ratio combining technique may be applied based on the optimized receive power 401, 402 for each antenna. As can be seen from FIG. 3, each antenna power 401, 402, which comprises for each antenna the optimized combined powers of the horizontally and vertically polarized radio frequency signals, is weighted with a corresponding weighting information and phase shifted with a corresponding phase information. The weighting information is individual for each antenna. The weighting may be based on weighting factors for adding the signal levels. Therefore, the sum of the weighting factors over all antennas may be normalised to one. As the powers are added to optimize the antenna gain Popt, the weighting information may comprise the squared weighting factors. In case of only two antennas, the weighting factors may be $\gamma$ and $(1-\gamma)$ and consequently, the weighting information is $\gamma^2$ and $(1-\gamma)^2$ as indicated in FIG. 3. In case of more than two antennas, different weighting factors may be used, wherein the sum is also one. The optimized antenna powers 401 and 402 are each weighted by their corresponding weighting information and phase shifted by their corresponding phase information and finally added resulting in the optimized received power Popt. For optimization, the weighting information $\gamma^2$ and $(1-\gamma)^2$ and phase information $\varphi_1$ and $\varphi 2$ may be varied in the following formula:

$$P_{opt} = f(\gamma^2 e^{j\varphi_1}(H1 e^{j\psi}\alpha^2 + V1(1-\alpha)^2) + (1-\gamma)^2 e^{j\varphi_2}(H2 e^{j\psi}\alpha^2 + V2(1-\alpha)^2))$$

The signals H1, H2, V1 and V2 may comprise absolute values of the corresponding received radio frequency signals 301, 302.

When receiving payload data 304 in step 107, the user equipment 30 may use the weighting information $\gamma^2$ and $(1-\gamma)^2$ and $\varphi_1$ and $\varphi_2$ for weighting and phase aligning signals received at the antennas 32 and 33, thus yielding an optimum antenna gain.

To sum up, according to the method described above, based on the configuration data transmitted from the base station to the user equipment device, at each antenna of the user equipment 30 two radio frequency signals having a different polarization are reliably identified and received, and based on these radio frequency signals it is possible to determine a preferred polarization for that specific antennas and scenario (orientation of the user equipment and properties of the radio channel). For example, the user equipment 30 may use the polarization association information when it selects a beam in a link setup procedure. The preferred polarization may be communicated to the base station 20, directly or indirectly by the selection of an associated resource, which then transmits subsequent payload data 304 using this preferred polarization. Under the assumption that a payload signal with the optimal polarization is received, the user equipment 30 may combine the signals from its antennas to optimize the antenna gain. Due to the optimization of the polarization of the transmitted radio-frequency signals, communication quality may be enhanced such that a higher signal-to-noise ratio may be achieved even at lower power levels. Therefore, the above-described method may be in particular advantageous in connection with very high frequencies, for example above 30 GHz, in particular for example at 80 GHz, which may lead to the use of array antennas and increased directivity. Which in turn makes it important to select the optimal beam for whatever polarization.

Although in the above description, the configuration data is transmitted from the base station to the user equipment, the same method may be performed in the reverse direction depending on the capabilities of the involved devices. For example, a user equipment having a correspondingly configured antenna arrangement, may also transmit configuration data indicating a first polarization of a first radio frequency signal and a second polarization of a second radio frequency signal, transmit the first radio frequency signal using the first polarization, and transmit the second radio frequency signal using the second polarization. Likewise, the base station may receive configuration data indicating a first polarization of a first radio frequency signal and a second polarization of a second radio frequency signal, receive at least one of the first radio frequency signal and the second radio frequency signal, and determine a combined power of the at least one of the first radio frequency signal and the second radio frequency signal based on the configuration data.

The invention claimed is:

1. A method for operating a communication device, comprising:
    transmitting configuration data indicating a first polarization of a first radio frequency signal and a second polarization of a second radio frequency signal,
    transmitting the first radio frequency signal using the first polarization, and
    transmitting the second radio frequency signal using the second polarization,
    wherein the configuration data includes a first identifier uniquely identifying the first radio frequency signal, and a second identifier uniquely identifying the second radio frequency signal, and
    wherein the first radio frequency signal comprises one of a first synchronization signal or a first pilot signal and the second radio frequency signal comprises one of a second synchronization signal or a second pilot signal.

2. The method of claim 1, wherein the first radio frequency signal and the second radio frequency signal differ in their corresponding first and second polarization only.

3. The method of claim 1, wherein the configuration data is transmitted using a broadcast channel.

4. The method of claim 1, wherein at least one of the first radio frequency signal and the second radio frequency signal is transmitted using a broadcast channel.

5. The method of claim 1, wherein the first polarization and the second polarization are orthogonal to each other.

6. The method of claim 1, wherein the configuration data indicates a first directionality of the first radio frequency signal and a second directionality of the second radio frequency signal, the method further comprising:
    transmitting the first radio frequency signal using the first polarization and the first directionality,
    transmitting the second radio frequency signal using the second polarization and the second directionality.

7. The method of claim 6, wherein the first directionality and the second directionality are the same.

8. The method of claim 6, wherein the configuration data indicates the first directionality and the second directionality with respect to a beam sweep including multiple beams of multiple directionalities.

9. The method of claim 1, further comprising:
    receiving a request for the configuration data, and
    transmitting the configuration data upon receiving the request.

10. The method of claim 1, wherein the configuration data comprises selector information indicating the first polarization and the second polarization based on a predefined mapping between a plurality of radio frequency signals and a plurality of polarizations.

11. A method for operating a communication device, the method comprising:
    receiving configuration data indicating a first polarization of a first radio frequency signal and a second polarization of a second radio frequency signal,
    receiving at least one of the first radio frequency signal and the second radio frequency signal, and
    determining a combined power of the at least one of the first radio frequency signal and the second radio frequency signal based on the configuration data,
    wherein the configuration data includes a first identifier uniquely identifying the first radio frequency signal, and a second identifier uniquely identifying the second radio frequency signal, and
    wherein the first radio frequency signal comprises one of a first synchronization signal or a first pilot signal and the second radio frequency signal comprises one of a second synchronization signal or a second pilot signal.

12. The method of claim 11, wherein the configuration data includes a first identifier uniquely identifying the first radio frequency signal, and a second identifier uniquely identifying the second radio frequency signal.

13. The method of claim 11, further comprising:
    transmitting a request for the configuration data.

14. The method of claim 11, wherein the configuration data comprises selector information indicating the first polarization and the second polarization based on a predefined mapping between a plurality of radio frequency signals and a plurality of polarizations.

15. A communication device comprising:
an antenna arrangement, and
a logic coupled to the antenna arrangement and configured to
transmit, via the antenna arrangement, configuration data indicating a first polarization of a first radio frequency signal and a second polarization of a second radio frequency signal,
transmit, via the antenna arrangement, the first radio frequency signal using the first polarization, and
transmit, via the antenna arrangement, the second radio frequency signal using the second polarization,
wherein the configuration data includes a first identifier uniquely identifying the first radio frequency signal, and a second identifier uniquely identifying the second radio frequency signal, and
wherein the first radio frequency signal comprises one of a first synchronization signal or a first pilot signal and the second radio frequency signal comprises one of a second synchronization signal or a second pilot signal.

16. A communication device comprising:
an antenna arrangement, and
a logic coupled to the antenna arrangement and configured to
receive configuration data indicating a first polarization of a first radio frequency signal and a second polarization of a second radio frequency signal,
receive at least one of the first radio frequency signal and the second radio frequency signal, and
determine a combined power of the at least one of the first radio frequency signal and the second radio frequency signal based on the configuration data,
wherein the configuration data includes a first identifier uniquely identifying the first radio frequency signal, and a second identifier uniquely identifying the second radio frequency signal, and
wherein the first radio frequency signal comprises one of a first synchronization signal or a first pilot signal and the second radio frequency signal comprises one of a second synchronization signal or a second pilot signal.

* * * * *